No. 819,552. PATENTED MAY 1, 1906.
J. W. JONES.
THILL COUPLING.
APPLICATION FILED JULY 10, 1905.
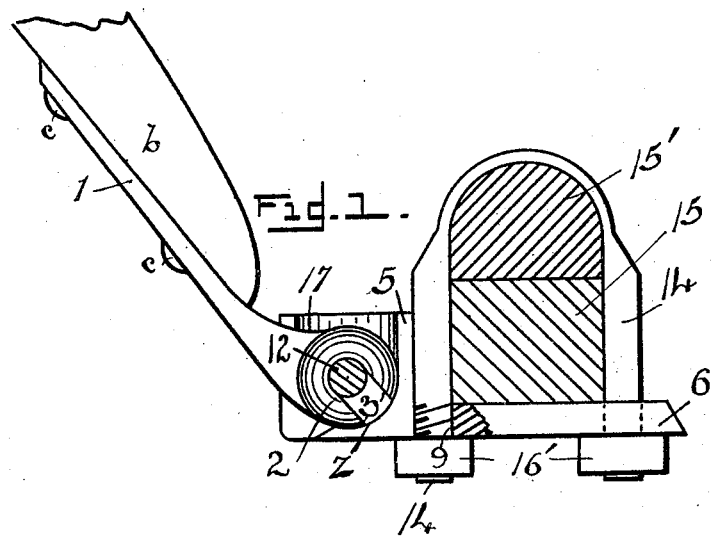
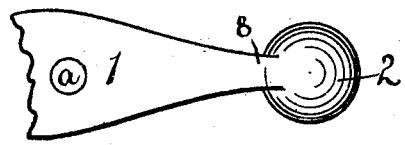
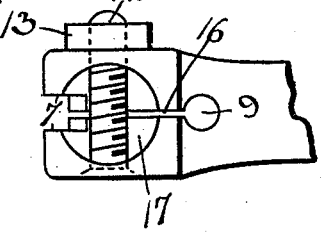
WITNESSES:
D. J. Sues.
N. H. Erwin.
John W. Jones
INVENTOR
BY G. W. Sues.
Attorney

UNITED STATES PATENT OFFICE.

JOHN W. JONES, OF COUNCIL BLUFFS, IOWA, ASSIGNOR TO JOEL W. WEST, OF OMAHA, NEBRASKA.

THILL-COUPLING.

No. 819,552.  Specification of Letters Patent.  Patented May 1, 1906.

Application filed July 10, 1905. Serial No. 268,914.

*To all whom it may concern:*

Be it known that I, JOHN W. JONES, a citizen of the United States, and a resident of Council Bluffs, in the county of Pottawattamie and State of Iowa, have invented a new and Improved Thill-Coupling, of which the following is a full, clear, and exact specification.

In the accompanying drawings I have shown in Figure 1 a side view, with a portion broken away, of a thill-coupling embodying my invention. Fig. 2 shows a top view of the thill-iron, while Fig. 3 shows a top view of the socket.

It is well known that it is often quite desirable to replace a tongue with a pair of shafts or shafts with a tongue. In order to provide a thill-coupling arranged so that the adjustment may be quickly made, I have constructed a quick adjusting and antirattling ball-bearing thill-coupling.

The further object of my invention is to remove the strain of the draft which usually comes upon the bolt from the bolt and distribute it within a socket, which is much stronger and more durable and much better adapted to receive the strain and very much less likely to break than a bolt.

In carrying out the object of my invention I provide a socket comprising the base or securing plate 6, which is perforated, as is shown at 9 in Fig. 1, to receive the stems of the ordinary carriage and wagon clip 14, made to stride the axle 15, as is usual in carriage and wagon construction. Extending from this securing-plate 6 is a housing or socket 5, which is provided with a cylindrical opening 17, as clearly shown in Fig. 1, which terminates below in a spherical seating 2, as clearly illustrated, and this housing or socket is provided with a slot 16, which, however, is enlarged in front, as is shown at 7, the slot 16 preferably entering the opening 9, as shown. Passing centrally through this socket or housing through suitable perforations is a clamping-bolt 12, provided with a nut 13, this bolt passing centrally through the socket in such a manner that the bolt forms the center of the circle bottom 2 within the housing, as shown in Fig. 1. By means of the nut 13 the socket may be pinched and brought together.

In connection with my slotted housing I use a thill-iron 1, provided with the narrow neck portion 8 of a wythe adapted to fit within the enlarged forward slot 7, while this thill-iron terminates in the ball or sphere 2, as clearly shown in Figs. 1 and 2. This ball or sphere is slotted, as is shown at 3, and the slot is of a width exactly corresponding to the thickness of the clamping-bolt 12, and the slot is almost in alinement with the major portion of the thill-iron 1, as shown in Fig. 1, so that the thills have got to be carried upward a suitable distance beyond their normal position before the slot 3 may be brought into vertical position to permit the slot 3 sliding over the bolt 12, so that the ball strides this clamping-bolt 12. In its normal position the thill-iron would be as disclosed in Fig. 1, in which position it would be impossible to raise the ball out of its socket, for the reason that the slot in that position is not in vertical alinement, and the socket preventing any lateral displacement of the ball the same is securely held within the socket. Now the forward portion of the ball 2 will work against the forward half of the socket, so that the strain and draft is distributed over the forward half of the housing. Now in adjusting the nut 13 the housing may be so adjusted that the ball 2 will be permitted a slight movement without allowing any rattling of the spring, however.

Now should it be necessary or desirable to remove a shaft provided with such a ball-provided thill-iron the operator would simply carry the same in a vertical position and slightly tap the iron to remove the same out of the socket, when the ball provided with a similar thill could be instantly reinserted into the housing. From this it will be noticed that I provide a quick adjusting thill-coupling, that the same is antirattling, that the same is a ball-bearing thill-coupling, and that the working strain is distributed over the area of a ball and socket. These thill-couplings may be made of various sizes, and,

Having thus described my said invention, what I claim is new, and desire to secure by United States Letters Patent, is—

A quick-adjusting thill-coupling, comprising a split socket, having a ball-bearing, of a clamping-bolt, passing through said socket and a thill-iron provided with a slotted ball, said ball being adapted to stride said clamping-bolt and work within said socket, substantially in the manner set forth.

In testimony whereof I affix my signature in presence of two witnesses.

JOHN W. JONES.

Witnesses:
 JOHN T. HENDERSON,
 M. KENDLE.